United States Patent
Greyson et al.

[15] 3,664,940
[45] May 23, 1972

[54] SUSPENSION DEWATERING METHOD

[72] Inventors: Jerome Greyson; Howard H. Rogers, both of Woodland Hills, Calif.

[73] Assignee: The United States of America as represented by the Secretary of the Interior

[22] Filed: Oct. 6, 1969

[21] Appl. No.: 870,443

[52] U.S. Cl. .............................................204/180 R, 204/300
[51] Int. Cl. .........................................B01d 13/02, B01k 5/00
[58] Field of Search .................................204/180 R, 299, 300

[56] References Cited

UNITED STATES PATENTS

| | | | |
|---|---|---|---|
| 720,186 | 2/1903 | Schwerin | 204/300 |
| 894,070 | 7/1908 | Schwerin | 204/180 R |
| 956,246 | 4/1910 | White et al. | 204/180 R |
| 1,435,886 | 11/1922 | Acton et al. | 204/180 R |
| 1,548,689 | 8/1925 | Klein | 204/299 X |
| 1,739,766 | 12/1929 | Morris | 204/180 R X |
| 3,506,562 | 4/1970 | Coackley | 204/300 |

Primary Examiner—John H. Mack
Assistant Examiner—A. C. Prescott
Attorney—Ernest S. Cohen and Benjamin H. Bochenek

[57] ABSTRACT

A method and device for removing water from normally difficult to filter suspensions, such as sludge wherein the suspension is disposed in a container having a negatively charged cathodic screen bottom surface and a moveable anode screen specially disposed within the suspension from the bottom cathode surface, together with means for controlling the electric potential between the anode and cathode, as well as the distance therebetween such that the water or other effluent can be removed through the cathode screen bottom surface leaving a cake of higher solids content. Additionally, means is provided for removing the cake formed between the cathode and anode from the suspension and continue the removal of water therefrom, while the cake is out of the suspension environment.

5 Claims, 6 Drawing Figures

Patented May 23, 1972

INVENTORS.
HOWARD H. ROGERS
JEROME GREYSON
BY
Ernest S. Cohen
Benjamin H. Boeland
ATTORNEY Patented May 23, 1972

INVENTORS.
HOWARD H. ROGERS
JEROME GREYSON

BY

Ernest S. Cohen
Benjamin H. Borlandt
ATTORNEY

Patented May 23, 1972

INVENTORS.
HOWARD H. ROGERS
JEROME GREYSON

BY
Ernest S. Cohen
Benjamin H. Bochenek
ATTORNEY

SUSPENSION DEWATERING METHOD

Electro-osmosis is a well-known and widely discussed phenomenon. It involves the movement of liquids such as water through a medium under the influence of an electric potential or EMF. Electro-osmosis has been utilized in an attempt to accelerate the drying of sewage sludge as a supplementary means to existing dewatering processes. For example, in one instance electro-osmosis is utilized in combination with a vacuum filtration apparatus, while in another embodiment electro-osmosis was utilized to accelerate the dewatering in an open sewage sludge bed where the sludge had been significantly reduced of its water content prior to the application of the electro-osmosis. In both cases, electro-osmosis was in effect applied to an existing sludge cake. This was accomplished by providing a screen as the outer wall for the sludge contained in the vessel and making this wall a cathode. Concurrently, an anode was embedded within the sludge material so that a potential was set up through the sludge in order to achieve electro-osmosis. The liquid which is positively charged moves toward the screen cathode so that electro-osmosis can transpire.

Considerable attention is currently being directed toward the treatment of waste water and the removal therefrom of both dissolved and suspended solids. The disposal of the solids which appear as waste sludges is a major problem. One of the most severe roadblocks in effective sludge disposal is dewatering. If convenient and economic dewatering techniques are available then the intrinsic fuel value of the sludge can be utilized to carry out final disposal by incineration. Few sludges lend themselves to dewatering conveniently or economically by conventional filtration or centrifugation techniques, primarily because these methods are dependent upon the hydraulic permeability or the gravity settling characteristics of the sludge suspensions. Thus, it has previously occurred to those working in the art to combine the aforedescribed electro-osmosis with conventional dewatering approaches. However, this has proved to be uneconomical.

In addition to the phenomenon of electro-osmosis in separating water from suspensions one must consider the inherently occurring electrophoretic drift of the solid particles in the sludge. This phenomenon has been recognized and in fact utilized in the prior techniques. The solid particles within the sludge are normally negatively charged, and thus will ordinarily move toward the positively charged electrode or anode which movement is opposite to the direction of the suspending liquid which moves toward the cathode. This electrophoretic movement of the solid particles toward the anode often creates a problem in prior art attempts to successfully remove a liquid from suspensions, in that the particles build up a hard layer or crust on the anode and effectively block out its effect. Thus, periodically the polarity between the anode and cathode was reversed in these systems so that the solid particles were loosened from the anode.

Thus, an object of this invention is to provide a novel method and device utilizing solely electro-osmotic pumping to remove water from a difficult to filter suspension.

Another object of this invention is to provide a novel method and device for forming a cake of relatively high solids content from the suspension utilizing electro-osmosis.

The above and other objects of the invention are accomplished by a device and resulting method of the electro-osmotic pumping of a suspension of a difficult to filter material such as sludge. The device of the invention comprises a container for the sludge suspension wherein the bottom surface of the container is an inclined porous screen which is connected to a negative terminal of a power source such that it becomes a cathode. Suspended above the inclined bottom surface is a moveable metal grid which is connected to a positive electric potential source and thus becomes an anode. Means is provided for moving the anode upwardly along the inclined cathode at a fixed constant distance from the bottom screen cathode. Additionally, a scraper means follows and cooperates with the moveable anode grid as it traverses the length of the bottom cathode screen from the bottom to its top. In operation, the container is partially filled with the sludge to be filtered. The bottom screen cathode is of such a size as to filter any sludge particles from the liquid. The cathode and anode are excited and a potential is maintained therebetween. In the starting position, the anode is disposed adjacent the downward end of the inclined bottom screen cathode. The potential must be sufficient to cause significant electro-osmotic pumping of the fluid through the bottom cathode screen which in turn overcomes an electrophoretic effect of the sludge particles such that they will collect on the bottom cathode screen between it and the anode. Concurrently, the anode is caused to traverse the bottom cathode screen moving from the bottom to its upper end. The scraper blade follows and pushes a formed cake upwardly along the inclined bottom until the cake is removed above the top surface of liquid sludge in the container. At this point the cake is then dried by continued electro-osmotic pumping of water, together with a controlled downward movement of the anode element as the formed cake shrinks due to loss of water such that contact is continuously maintained between the cake and the anode. The continued movement of the following scraping element after this step serves to force the formed cake off of the bottom incline surface into a collecting element.

It is believed that the invention will be better understood from the following detailed description and drawings in which.

Figure 1:
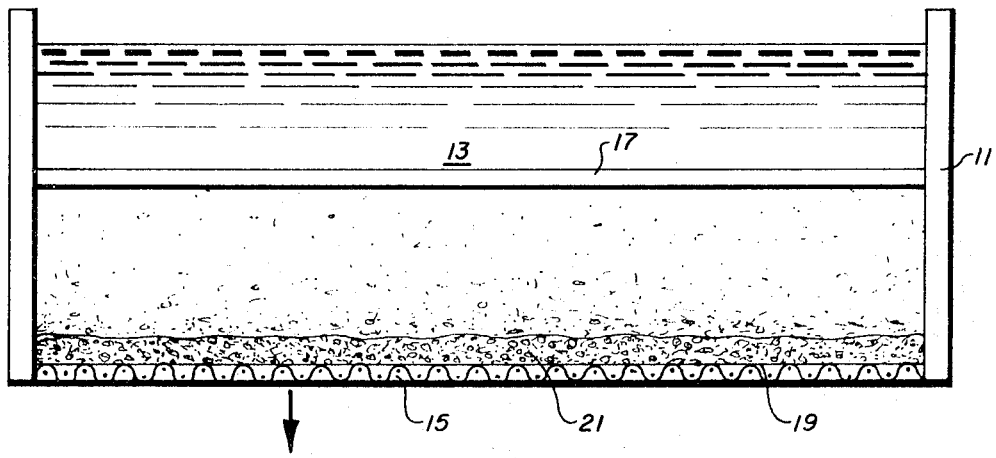
FIG. 1 represents a schematic representation of the anode and cathode screen relative to a suspension illustrating the novel effects of the herein invention.

Attention is first directed to FIG. 1 and an explanation of the phenomenon discovered in the course of making the herein invention. It has been unexpectedly found, as indicated above, that utilizing the concept of the herein invention one will form a layer of sludge from a dewatered suspension at the surface of a cathode by utilizing electro-osmosis. Schematically shown in FIG. 1 is a container or vessel 11 which holds the suspension 13. The bottom surface of the vessel 11 is comprised of a cathodic screen 15. Spatially disposed above the cathode screen 15 is an anode 17 which could, for example, be a plate or a screen to allow the material above it to flow down toward the cathode. It was found that in order for the principle of the herein invention to successfully work, a thin film of sludge must initially be formed on the inner surface 19 of the screened cathode. In order to effect this, the cathode 15 must have a differential pressure on each side thereof. In other words, it cannot be embedded within a body of sludge, but rather the sludge is contained on one side while the opposite side is exposed to the atmosphere or some other differential pressure. This will then allow the film of sludge to be inherently formed by a gravity flow of the material and some of the water through the screen before or concurrent with activation of the electrodes.

As mentioned, one would expect that since the surface charge of the sludge is negative the solids will tend to accumulate at the anode by electrophoresis and that only the water would flow to the cathode 15. However, it was found that a high voltage drop occurred across the thin film of sludge at the inner surface 19 of the cathode screen. This leads to a higher rate of electro-osmotic flow through the thin film than throughout the bulk of the suspension. In other words, what occurs is that the electro-osmotic flow velocity through the initially formed film must inherently exceed the electro-osmotic velocity of liquid in the bulk of the sludge. When this occurs, the effect upon the bulk of the sludge or suspension is to cause a general flow toward the cathode 15. The force of this flow is sufficient to overcome the electrophoretic effect and the solid sludge particles are carried by the liquid to the cathode 15 where a cake 21 is built up thereon. This flow is of course aided by natural gravity flow.

Further, it was found that there was very little concentration of the sludge at the anode surface. Analysis of the system indicated that a severe drop in pH in the immediate vicinity of the anode occurred which resulted from electrolysis. The pH value was found from various measurements of the sludge electrophoretic mobility to be low enough to reduce the sludge surface charge to zero at the anode. Thus, there was no longer any attraction between the surface charge of the sludge and the anode.

It should be pointed out, that when no initial film was formed on the cathode 15, the results of the herein method could not be achieved. In other words, one cannot establish the apparently required high potential gradient at the surface of the screen cathode without the film present. Without such a higher potential gradient in that region, electro-osmosis cannot overcome the electrophoretic effect of the sludge particles toward the anode and thus a cake build-up on the cathode will not be achieved.

In practicing the invention, the distance between the anode 17 and screen cathode 15 is a tradeoff between the thickness of cake 21 desired and pumping efficiency; i.e., watt-hrs/ml of effluent pumped. One does not want to dissipate too much of the energy in the bulk suspension material 13. Thus, by maintaining the anode 17 closer to the screen cathode, the electrical efficiency of the process is maximized because the power loss in the bulk of the suspension is minimized. However, the extent of build up of that cake will obviously be inherently limited by the distance of the anode from the cathode.

In the herein invention, with the anode 17 maintained at a desired distance from the screen cathode 15 during operation of the device, a cake 21 will build up from the sludge particles accumulating on the cathode to fill the space between the two elements. As will be explained, when this cake is removed from the environment of the remaining suspension 13 continued drying can transpire with further electro-osmotic pumping and movement of the anode 17 downwardly toward the screen cathode 15 as the cake shrinks due to loss of water. The result of such a continuous removal of water will provide a sludge cake having unusually high solids content of about 30 percent.

Figures 2, 3:
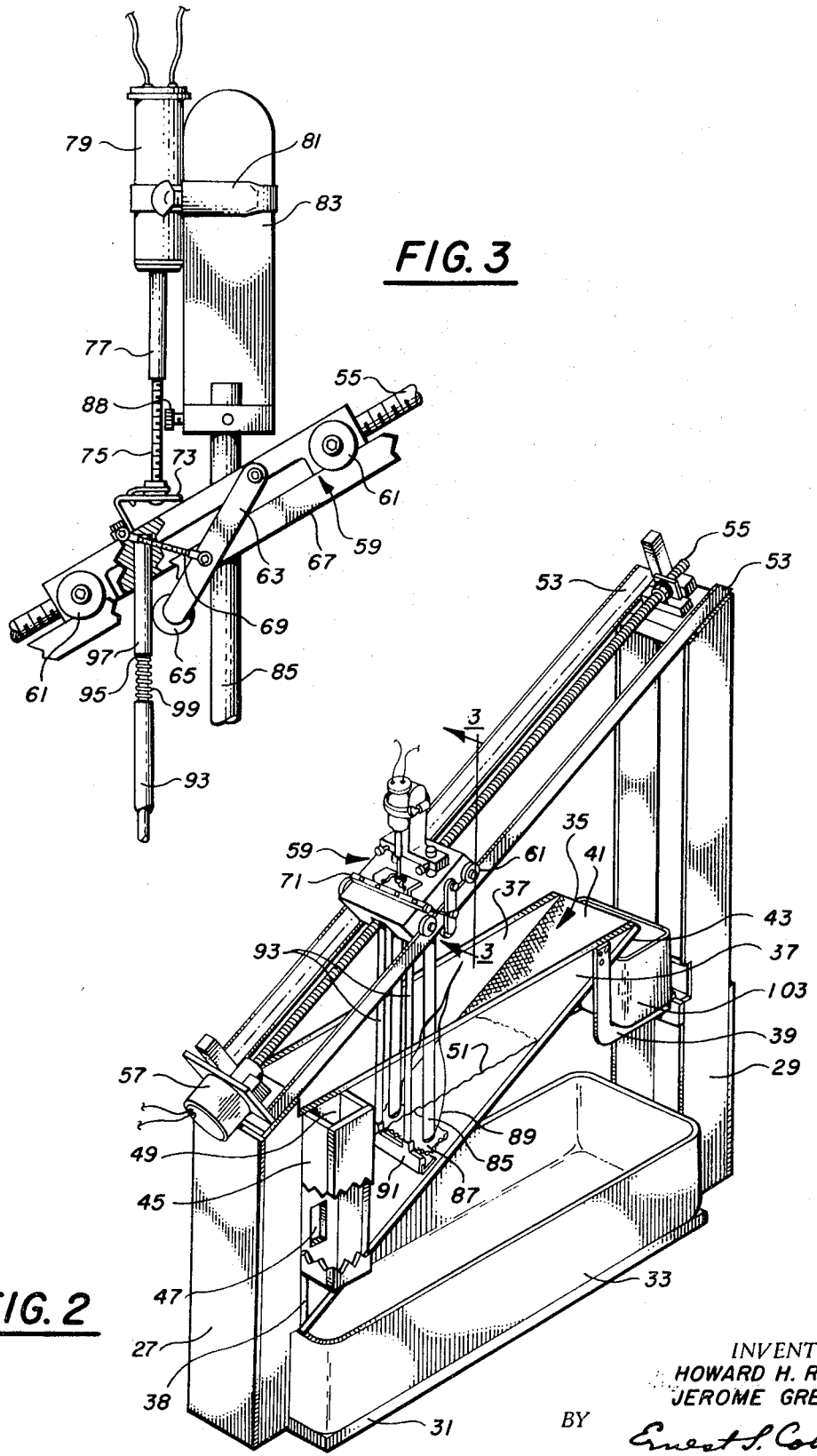
FIG. 2 is a pictorial representation of a novel apparatus utilized to perform the method of the herein invention.
FIG. 3 is an enlarged plan view taken along lines 3—3 of FIG. 2 showing a portion of the device of the invention.

Turning now to FIGS. 2 and 3, there is seen an embodiment of a device suitable for practicing the herein novel method of sludge removal. The device comprises two upright supports 27 and 29, respectively, which are connected to each other by a base 31. Resting on the base 31 is a tray 33 for collecting water removed from the sludge. Disposed between the supports 27 and 29 is a vessel 35 for containing the suspension to be watered. Vessel 35 is comprised of side walls 37 and rear wall 38. The rear wall 38 is in turn rigidly affixed to support 27. The sides 37 of the vessel have mounting brackets 39 affixed to their opposite end from support 27. Mounting brackets 39 in turn are connected to the opposite support 29, thus serving to suspend the sides 37 between the two support structures.

As can be seen, the side walls 37 are triangularly shaped with the hypotenuse forming the bottom edge of the vessel 35. The bottom surface of vessel 35 is comprised of a wire screen mesh 41 having a lead 43 connected thereto, such that the bottom screen mesh can become a cathode for the operation of this invention. It should be obviously appreciated that since it is desirable that only the bottom screen 41 be cathodic it must be insulated from the side walls 37 in the remaining portion of the device. One manner in which this is most feasibly accomplished is for the side walls 37 to be comprised of a non-conductive material, such as a plastic or resinous sheet. Alternatively, of course, the side walls 37 can be comprised of a conductive material with an insulation layer utilized to attach the screen 37 to the walls. Due to the foregoing described configuration, the bottom surface for screen cathode 41 thus slopes upwardly from the rear wall 38 of the vessel 35 towards the support structure 29.

It is preferred that addition of the suspension material to be filtered be made to vessel 35 without disturbing the material within the vessel. This can be accomplished by providing a fill box 45 mounted on one side 37 of the vessel. An opening 47 is provided in the wall of the side 37 within the fill box 45. Thus, material can be put into the top 49 of the fill box 45 and enter through this opening 47 below the surface of the suspension 51 within the vessel without causing turbulence and disturbing the overall operation of the device.

Extending between the upper ends of support structures 27 and 29 are spaced apart rails 53. The rails 53 will slope upwardly from the top of support structure 27 to the top of the structure 29. The angle of incline of the rails corresponds exactly to the incline of cathode surface 41 of the vessel 35. Disposed between rails 53 and affixed to the support structures is a screw drive 55 driven by motor 57. Mounted on the rails 53 is a trolley 59. Screw drive 55 passes through and cooperates with an internal threaded aperture (not shown) within the trolley 59, such that the trolley can move up and down rails 53 depending upon the direction of rotation of the screw as controlled by motor 57. Trolley 59 has freely rotating wheels 61 which extend over rails 53 and serve to prevent lateral movement of the trolley 59 relative to the rails as it is driven by screw 55. Additionally, the trolley has on either side thereof an arm 63 extending downwardly to a rotatable wheel 65 which grips the underside of bottom surface 67 of the rails 53. The tension on arm 63 is adjustable by a threaded level 69 pivotally connected to a bracket 71 disposed on the top of the trolley. The wheels 65 disposed on each side of the trolley, as indicated, serve to prevent the trolley from lifting up off of the track 53 as it is driven by screw 55 and assures that it is maintained a constant fixed distance relative to the bottom screen cathode 41.

Attached to the top surface of the trolley 59 is a mounting bracket 73 to which is secured vertically extending threaded shaft 75. The externally threaded shaft 75 in turn engages with an internally threaded separate shaft 77 which is rotatably driven by a motor 79. Thus, as the motor 79 is operated and turns its internally threaded shaft 77 it will move up and down on the externally threaded shaft 75 which is in turn fixedly secured to the trolley.

Mounted on motor 79 by means of an adjustable tight fitted band 81 is a support bracket 83 which serves to hold two downwardly extending rods 85. The rods 85 are adjustably secured to the support bracket 83 by means of screws 88 and are of a nonconductive material such as Nylon or the like. The rods 85 pass through openings provided in the trolley 59 and are thus free to move relative to the trolley. The rods serve the function of securing the anode element 87 relative to the cathode 41. Any suitable means such as screws or the like can be utilized to attach the anode 87 which can, for example, comprise an expanded metal sheet of platinized titanium. Leads 89 to the anode 87 can be attached to one of the support rods 85 and brought out of the vessel 35 toward a suitable control (not shown). Thus, in the operation of the device it can be seen that as motor 79 moves up and down on the fixed externally threaded shaft 75, the support bracket 83 and associated rods 85 will correspondingly move the anode element 87 relative to the bottom cathode screen 41.

Additionally, affixed to the trolley 59 is a scraper element 91 which is comprised of a nonconductive material such as plastic or the like. The scraper 91 is affixed to tubes 93 which extend upwardly toward the trolley element 59. The tubes 93 engage a reduced portion 95 of a downwardly extending rod 97 from the trolley and are separated therefrom by a spring 99 which serves to maintain some tension of the scraper on the cathode surface 41 while allowing freedom of movement of the scraper due to any variations in the cathode surface or spacing between the trolley and the cathode.

Figure 4:
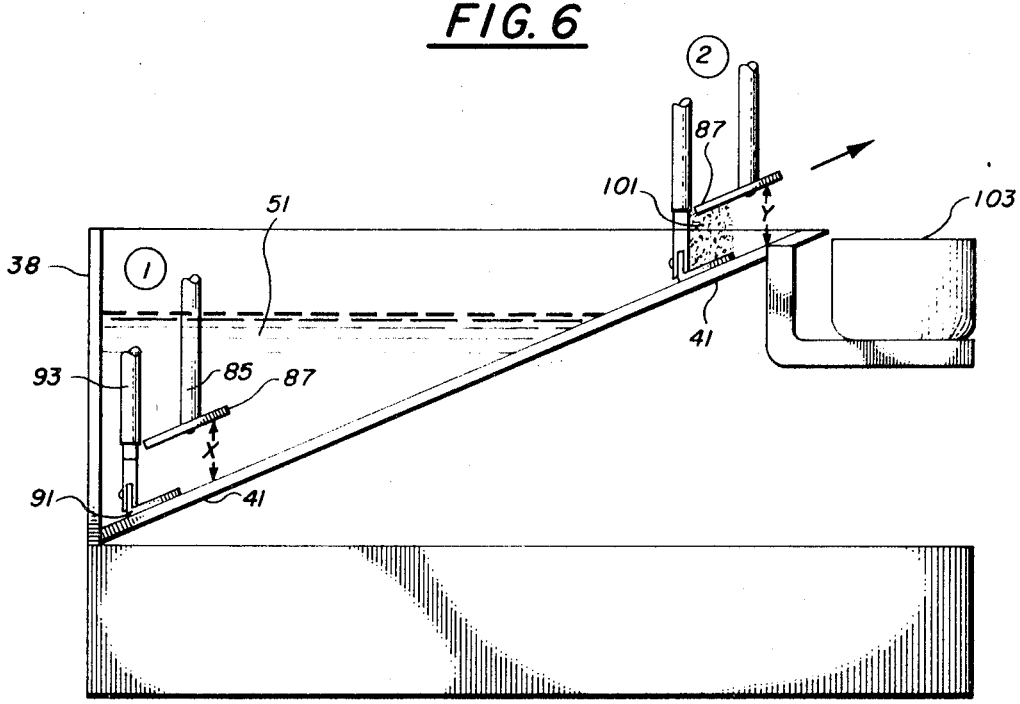
FIG. 4 is a schematic representation showing the positioning of the electrodes while carrying out the method of the invention utilized in the device shown in FIGS. 2 and 3.

As seen in FIG. 4, the anode 87 is disposed a predetermined distance X from the surface of the cathode 41 at the beginning of the operation of the device. In this position, the anode 87, together with the associated scraper element 91, is disposed at the bottom or lowest end of the inclined cathode 41 adjacent the end surface 38 of the vessel. Once the device is started the trolley element 59 slowly moves the anode 87 and scraper blade 91 upwardly along the cathode 41 while the distance X is constantly maintained between the anode and cathode. During this period water is pumped by electro-osmosis through the screen cathode 41 and a dense layer of sludge is formed across the distance X between the cathode and anode. This build up of sludge or a cake increases as the anode moves upwardly along the cathode. In the position 2 shown in FIG. 4 the scraper element 91 has actually lifted the formed cake 101 out of the suspension 51 contained in the vessel.

It should be pointed out that in the operation of the herein device the suspension within vessel 35 should always allow for a sufficient portion of the cathode 41 to protrude therefrom at the uppermost end such that a solid cake can be successfully removed from the remainder of the suspension as seen in FIG. 4 while maintaining complete contact between the cake and the cathode in this position. The length of screen protruding from the suspension effectively determines the length of drying time of the cake in this continuous process. Thus, the length of screen cathode protruding from the suspension is preferably equivalent to several cake lengths in order to achieve the desired drying out of the suspension. While the cake 101 is in position 2 it is continuously drying and the solid content is thus increased. This once again is accomplished by electro-osmotic pumping of the water from the cake. The distance Y between the anode 87 and cathode 41 will continually shrink as the cake is dried. In order for the electro-osmotic pumping to be effective, the anode 87 must be in contact with the cake 101 as its shrinks. Thus, a sensing circuit is utilized to indicate when a shrinking occurs sufficient to maintain a potential gradient across cake 101 between the anode and cathode. The circuit will then automatically actuate motor 79 on the trolley and in turn move the anode 87 in a downwardly direction as the cake shrinks. The shrinking is continued at this point until the solids content will reach approximately 30 percent. This is indicated by a fairly rapid rise in potential which is not decreased by further anode movement. After this, the continued upward movement of the trolley forces the cake 101 off the end of the cathode 41 onto a platform or receptacle 103 mounted on bracket 39.

Figure 5:
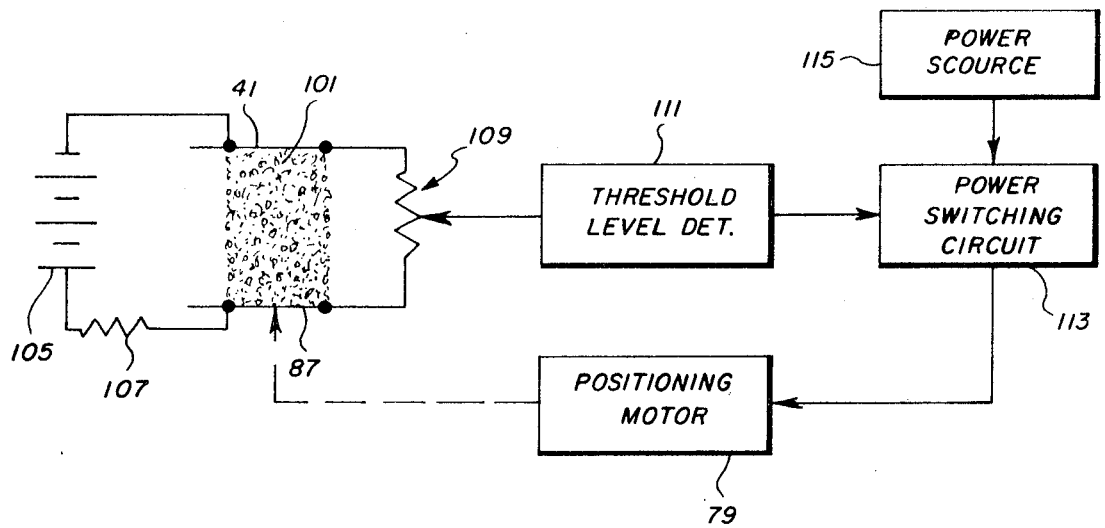
FIG. 5 is a block diagram of the circuitry used to control the apparatus shown in FIGS. 2 and 3.

Turning to FIG. 5, there is seen a typical circuit that can be utilized to control movement of the anode relative to the cathode by actuating the motor as described above with regard to the drawing of the cake 101 in position 2 shown in FIG. 4.

Turning now to FIG. 5, there is seen a block diagram of the circuitry used to control the spacing between the anode and cathode. A power source 105 having an internal resistance 107 establishes a potential between the cathode 41 and anode 87. The suspension in which the anode and cathode are embedded is sufficiently conductive so as not to affect the operation of the circuit. However, once the cake 101 is removed from the body of the sludge, the aforegoing circuit then comes into play, during the drawing of the cake and subsequent shrinkage thereof due to the water removal. When the cake 101 shrinks, as indicated, it will be due to water removal as well as movement of the solid particles toward the cathode 41, thus providing a gap between the top of the cake and the anode 87. When this occurs there is an increased resistance in the current path between the anode and cathode. Thus, the potential between the cathode and anode will increase. This increase in potential is reflected at the arm of potentiometer 109. When the potential reaches the conduction point of a threshold level detector 111 which can comprise, for example, a Zener diode, the detector 111 actuates a power switching circuit 113 driven by power source 115. The power switching circuit 113 will then drive the positioning motor 79 so as to drive the anode 87 toward the cathode. When the desired potential in the current path reaches the predetermined level as set by the potentiometer 109 the threshold level detector 111 will no longer conduct deactivating the power switching circuit 113 which in turn stops motor 79 and thus the movement of the anode 87. Thus, it can be seen that the herein device is essentially operated at either constant power or current. Thus what occurs is when there is an increase of resistance at the top of the cake adjacent the anode 87 the sensing circuit triggers the positioning motor 79 to move the anode back into contact with the cake so that the device will continue to operate a desired potential gradient.

Figure 6:
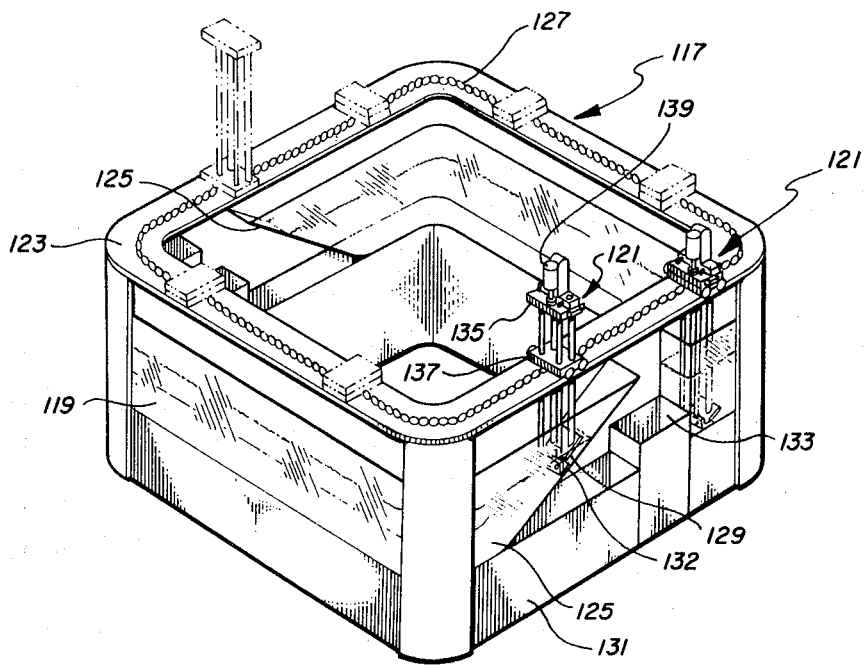
FIG. 6 is a pictorial representation of an embodiment of the herein invention for a continuous process of dewatering.

FIG. 6 is a pictorial representation of a continuous dewatering device utilizing the basic concept of this invention. As seen, there is provided a rectangular housing or storage tank 117 for containing sludge suspension 119 to be dewatered. Unlike the device shown in FIGS. 1-4, the trolley element 121 in this embodiment moves along a track 123 that is flat and parallel to the bottom surface of the storage tank 117. Within the storage tank there is provided a plurality of upwardly extending cathodes 125, two shown by way of example on opposite sides of the device. However, there can obviously be four such cathodes, one in each side of the device. Since the trolley 121 driven by a chain drive or the like, 127, moves on a flat bed relative to the sloping cathode, it must be programmed so as to move the associated anode 129 and scraper element 131 in a parallel upward direction as it traverses the cathode. The water removed is collected in a storage vessel section 132, located below the cathode 129. After the formed cake is dried, it is dropped onto a platform 133 and the trolley element 121 moves onto a next section and drops down into the sludge therein to begin the process once again. The trolley element 121 utilizing this embodiment is actually composed of two platforms 135 and 137, respectively. The control motor 139 operates to drive an upper platform 135 relative to the fixed bottom platform 137, thus serving to raise or lower the anode 129 and associated scraper blade 131.

Experiments were carried out using the novel apparatus shown in FIGS. 2 and 3 to dewater digested sludges having initial suspended solids contents of between 2 and 3 weight percent. These experiments revealed that a possible range of total voltages for both anode and cathode was between 7 and 50 volts. However, the lower limit of voltage employed is set by the electrode potentials. This is generally about four volts total for both anode and cathode. The upper voltage limit is set by the current carrying ability of the anode. Further, it has been found that the electric power requirement is proportional to about the 1.6 power of the pumping rate. Thus, as indicated, though the pumping increases significantly with increased applied voltage, the power efficiency decreases so that the process might become uneconomical.

What is claimed is:

1. A method of dewatering a liquid suspension of fine solid particles comprising:
    disposing said suspension on top of a screen cathode,
    spatially disposing an anode in said suspension above said cathode,
    forming a thin film of the solid particles of said suspension on the surface of said cathode in contact with said suspension,
    establishing an electric potential between said anode and cathode sufficient to both pump the liquid through said screen by electro-osmosis and force said solid particles of said suspension to build up on said cathode toward said anode,
    forming a wet cake of solids between said anode and cathode,
    removing, and concentrating said formed cake from said suspension,
    continuation of electro-osmosis during removal and concentration of said formed cake,
    and further pumping of liquid from said formed and concentrated cake by electro-osmosis after said formed cake has been fully removed from said suspension.

2. The method of claim 1 wherein said removed cake is led between a screen cathode and an anode, and further comprising:
   maintaining contact of said cake with said anode and cathode as said cake shrinks due to liquid removal therefrom.

3. The method of claim 2 wherein said cake rests on said cathode and said anode is controllably moved downwardly toward said cathode as said cake shrinks.

4. The method of claim 2 wherein the bottom screen cathode of said container is slanted upwardly from below the surface of said suspension to above said surface and comprising:
   moving said anode parallel to said cathode from below said surface of said suspension to above said surface, and correspondingly moving a means for forcing said formed cake between said anode and cathode to follow the movement of said anode.

5. The method of claim 1 wherein said removed cake is held between a screen cathode and an anode, and further comprising:
   maintaining contact of said formed cake with said anode and cathode,
   detecting changes in electrical resistance of said formed cake as said cake shrinks due to liquid removal therefrom,
   and moving said anode toward said cathode in response to said detected changes in resistance to maintain the contact of said formed cake with said anode and cathode.

* * * * *